Jan. 8, 1935. E. J. HENDRICKSON ET AL 1,987,478
ADVERTISING DEVICE
Filed April 28, 1933
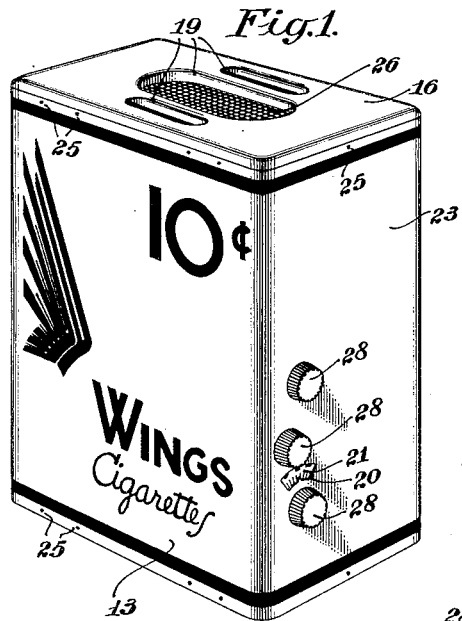
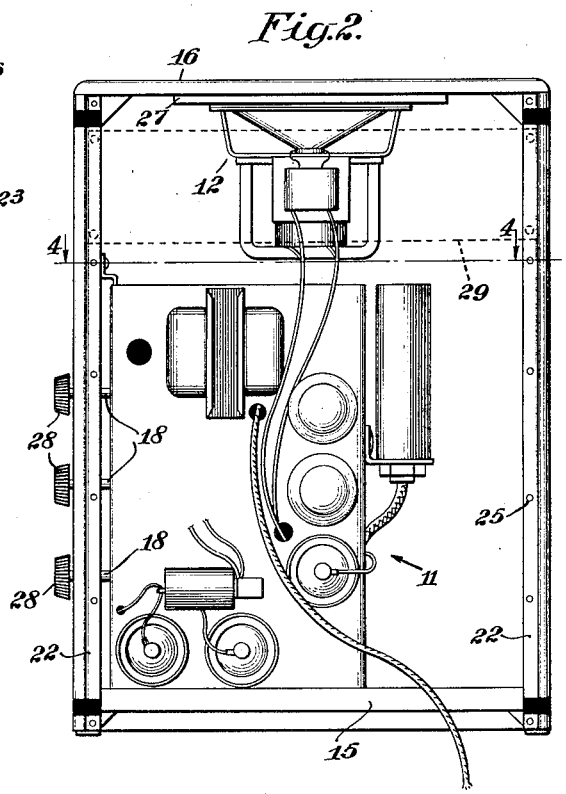
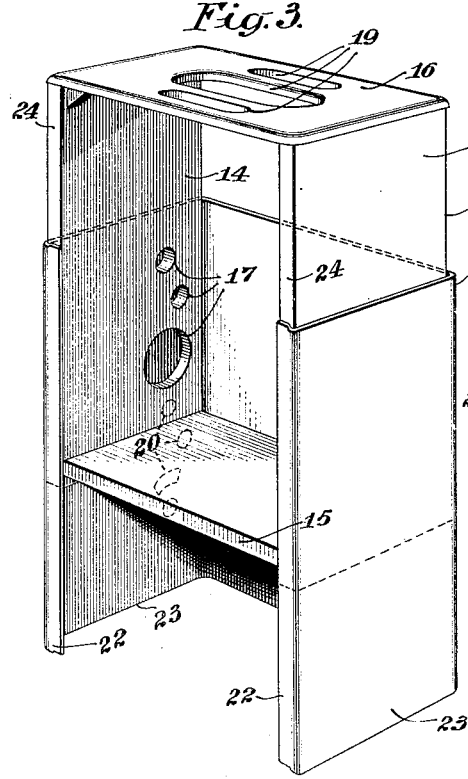
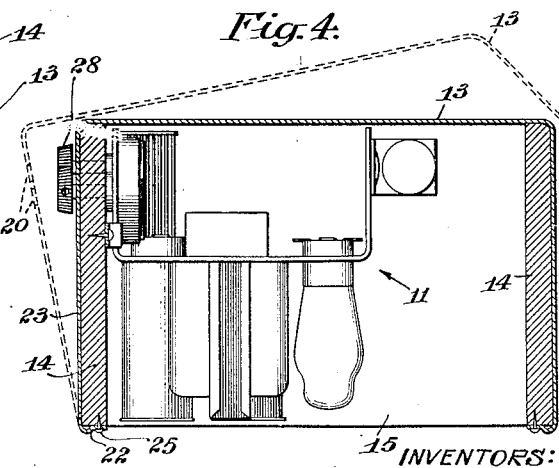
INVENTORS:
Emil J. Hendrickson,
Albert C. Winters,
BY J. R. Goldsborough
THEIR ATTORNEY.

Patented Jan. 8, 1935

1,987,478

UNITED STATES PATENT OFFICE 1,987,478

ADVERTISING DEVICE

Emil Joseph Hendrickson, Philadelphia, and Albert C. Winters, Lansdowne, Pa., assignors to Radio Corporation of America, a corporation of Delaware Application April 28, 1933, Serial No. 668,324

6 Claims. (Cl. 40—126)

The present invention relates to advertising devices and, more particularly, to advertising devices having sound reproducing apparatus associated therewith.

Advertising devices in general, and portable advertising devices in particular, such, for example, as those used for counter or window display purposes in various business establishments, at best attract only casual attention unless they have some outstanding characteristics which set them apart from other advertising devices of the same or similar type.

It is, therefore, an object of our invention to provide an advertising device of the character specified which will serve to effectively attract attention to the advertising features thereof.

Another object of our invention is to provide an advertising device of the character specified which will appeal to the ear, as well as the eye, of the purchasing public.

A further object of our invention is to provide an advertising device of the character specified which represents an enlarged facsimile of the container of one of a large number of nationally advertised articles of merchandise, for example, cigarette packages, condensed soup containers, wrappers for cakes of soap, cans of tobacco, etc., or, if desired, an enlarged facsimile of the article or product itself.

Another object of our invention is to provide an advertising device in the form of an enlarged facsimile of an advertised article of merchandise, or the container or wrapper therefor, having a sound reproducing apparatus inconspicuously housed therewithin.

A further object of our invention is to provide an advertising device in the form of an enlarged facsimile of the character noted heretofore having a sound reproducing apparatus inconspicuously associated therewith in such manner that it may readily and easily be removed from said apparatus and a facsimile of another product substituted therefor for association with said apparatus.

With the above and other objects in view, the invention resides in the novel construction, and arrangement of parts, the novel features of which are set forth with particularity in the appended claims. The invention itself, however, both as to its organization and its method of operation, together with additional objects and advantages thereof, will best be understood from the following description of a specific embodiment, when taken in connection with the accompanying drawing, in which Fig. 1 is a perspective view of an advertising device constructed in accordance with our invention;

Fig. 2 is a slightly enlarged rear elevational view of the device illustrated in Fig. 1;

Fig. 3 is a perspective view illustrating a step in the initial assembly of the device shown in Figs. 1 and 2; and Fig. 4 is a sectional view taken on the line 4—4 of Fig. 2 illustrating the manner of attaching or detaching an advertisement bearing member to or from the device subsequent to its initial assembly.

Referring more particularly to the drawing, wherein similar reference characters indicate corresponding parts throughout, our improved advertising device consists essentially of a container or casing 10, sound reproducing apparatus in the form of a radio receiver 11 and loudspeaker 12 therefor housed therein, and an advertisement bearing member 13 substantially enveloping the said casing.

The container or casing 10 consists, in the example shown, of two vertically disposed, parallel side members 14 which are suitably joined, in spaced relation at points adjacent their free ends, by a transverse bottom member 15 and a similarly disposed top member 16. One of the side members 14 is provided with a plurality of clearance openings as indicated at 17, for passage therethrough of a plurality of control shafts 18 forming a part of the radio receiver 11. The top member 16 is also provided with suitable elongated openings as indicated at 19, whereby an outlet for sound emanating from the loudspeaker 12 is provided.

The advertisement bearing member 13 consists preferably of a substantially trough-shape, preformed, sheet metal member which corresponds in size to that of the casing 10 and which has advertising subject matter preferably, although not necessarily, lithographed thereon which relates to the article of merchandise of which the combined casing 10 and member 13 is an enlarged facsimile.

One side wall of the member 13 is provided with a plurality of relatively small clearance openings 20 adapted for receiving the control shafts 18 therethrough and which are so located as to register with the relatively large openings 17, in one side member 14 of the container 10, after the said container and member 13 have been joined in co-operative relation. As clearly shown in Fig. 1, one of the said openings 20 is of such size and shape as to expose a portion of a dial scale 21 of the radio receiver 11 in a manner well understood by those skilled in the art.

In the initial assembly of the casing 10 and the lithographed cover member 13, the said member is preferably telescoped over the body of the casing 10 in the manner illustrated in Fig. 3 of the drawing wherein it will be observed how the vertically disposed, flanged marginal edge portions 22 of the side walls 23 of the member 13 co-operate with one edge face 24 of each of the side members 14 to maintain the member 13 substantially in contacting engagement with the casing 10. After the member 13 has been fitted on the casing 10, suitable brads, screws, or the like, as indicated at 25, may be utilized to more securely attach the member 13 to the casing 10.

The loudspeaker 12 is next bolted or otherwise secured to the underside of the transverse member 16 in suspended relation thereto and in central alignment with the elongated openings 19 formed therein. In order to protect the diaphragm or cone of the loudspeaker 12 against injury, a section of woven wire mesh 26 or, alternatively, a section of suitable grille cloth, either of which is backed up with a suitable annulus 27 of cardboard or the like, is preferably interposed between the loudspeaker 12 and the underside of the transverse member 16, as clearly shown in Fig. 2.

The radio receiver 11 is disposed in the casing 10 preferably in a vertical plane (Fig. 2) and anchored to one side member 14 in order to project the control shafts 18 of the receiver sufficiently through the clearance openings 17 formed in the casing 10 and the openings formed in the member 13, to permit the attachment of suitable control knobs 28 to the free ends of the said control shafts after the radio receiver has been secured in the casing 10.

In the use of our improved advertising device, should it, at any time, be desired to change the nature or subject matter of the advertising legend appearing on the member 13, the said member may be detached from the container 10 in the manner illustrated in Fig. 4, after the control knobs 28 have been removed from the free ends of the control shafts 18, and a similar member bearing advertising matter differing from that appearing on the detached member, but relating to another article of merchandise of which our improved advertising device is an enlarged facsimile, substituted therefor.

We have found, by experimentation with radio receivers of the character exemplified, that the enclosing walls of the casing 10 and the cover member 13 present the effect of a "Helmholtz" resonator, when in operation, whereby undesirable cabinet resonance is produced. In order to mitigate the above-noted resonance effect, we provide a relatively small baffle plate or board 29, as indicated by the broken lines in Fig. 2, which is suitably attached to and across the rear of the casing 10, and preferably spaced a sufficient distance from the rear edge of the transverse top member 16 to provide sufficient leakage for the sound waves set up by the loudspeaker 12 to substantially obviate cabinet resonance in a manner understood by those skilled in the art.

While we have shown and described one practical embodiment of an advertising device constructed in accordance with our invention, it is to be expressly understood that we consider it within the scope of our invention to embody the inventive idea, underlying our invention, in a facsimile of any article of merchandise whether it be packed in a container, enclosed in a wrapper, or the bare article itself. It is also within the scope of our invention to substitute a lithographed or printed label or wrapper facsimile or advertisement bearing member of cardboard, paper, or cloth in lieu of the metal member 13, or, alternatively, the casing 10 itself may be so constructed as to present a complete facsimile of an article of merchandise and the desired advertising or identification legend painted or otherwise placed directly on the walls of the casing.

In such cases, where the casing 10 is in the form of a sheet metal container simulating a known article of merchandise, and the label, wrapper, or advertisement indicia placed directly on the outer surface thereof as by lithographing, painting, or by means of a label, we may dispense with the label, painting, or lithographing and cut the letters comprising the words of the said indicia directly in the body of the container, a sheet of translucent material being preferably placed over the cut letters from within the container and a source of illumination disposed therewithin to illuminate the indicia so formed.

Instead of extending the control shafts 18 of the radio receiver 11 through the walls of the casing 10 and the member 13, we may so position the radio receiver within the casing 10 that the said control shafts will project rearwardly of the casing 10 and thereby obviate the appearance of any element outwardly of the casing which is not essential to the advertisement or the article of merchandise simulated by our device.

Wherever we have used the term "facsimile of an article of merchandise" in the specification and/or the claims, we intend this to refer not only to the article of merchandise itself but also to the wrappers, containers, or the like, or to the bare article itself.

Although we have shown a specific embodiment of our invention, we are fully aware that many modifications thereof are possible. Our invention, therefore, is not to be restricted except insofar as is necessitated by the prior art and by the spirit of the appended claims.

We claim as our invention:

1. In an advertising device, the combination of a hollow frame adapted to receive radio apparatus including control means therefor and a loudspeaker, said frame having a sound outlet opening in one surface thereof and a plurality of openings in another surface thereof whereby to extend said control means through one surface of said frame, a preformed member of sheet material having a plurality of openings in one surface thereof and representing an enlarged facsimile of a known article of merchandise adapted to receive said frame in contacting engagement therewith, and means for detachably securing said member to said frame, said openings in said member being adapted to register with said plurality of openings in said frame whereby to extend said control means outwardly of said device.

2. In an advertising device, a hollow frame adapted to house radio receiving apparatus including control-means projecting therefrom, the frame having a sound outlet in one element thereof, and a plurality of openings in another element thereof adapted to accommodate the said control-means, an identification indicia bearing trough-shape member of sheet material having parallel marginal edge portions substantially enclosing the frame, the said member simulating an article of merchandise and being provided with a plurality of openings registering with the openings in the frame, and means detachably securing the frame and member together in nested relation.

3. In an advertising device, a hollow frame adapted to house radio receiving apparatus and having a sound outlet in an element thereof, a loud speaker supported within said frame adjacent to said sound outlet, a trough-shape identification bearing member of sheet material simulating the superficial appearance of an article of commerce, the member and frame being disposed in nested relation to constitute a composite cabinet having an open back, means detachably securing said frame and member together, and baffle means extending transversely of the open back of said composite cabinet adjacent the member provided with the sound outlet to thereby minimize cabinet-resonance.

4. In an advertising device, the combination of a casing having two open sides and an opening in one surface thereof, an identification indicia bearing member representing a facsimile of an article of merchandise and adapted for enclosing a portion of said casing including one of said open sides, means formed with said member for detachably securing said member to said casing, and means carried by said casing in spaced relation to two of its surfaces for partly closing the other of said open sides, said casing being adapted for the reception of a radio receiver including a loudspeaker.

5. In combination, a hollow casing adapted to house and support radio receiving apparatus, the casing including side portions inter-connected by a top portion and being devoid of a front portion, a substantially trough shape member of sheet material telescopically embracing the casing to provide a front closure for the otherwise open front portion of the casing and means for detachably securing the casing and the member together whereby the casing may be interchangeably associated with any one of a plurality of differently decorated trough-shaped members to constitute a radio-receiver cabinet adapted for varied advertising purposes.

6. The invention set forth in claim 5 characterized in that the casing is devoid of a back portion and further characterized in that the otherwise open back portion of the cabinet is partially closed by a baffle member.

EMIL JOSEPH HENDRICKSON.
ALBERT C. WINTERS.